US007438305B2

(12) United States Patent
Schulz

(10) Patent No.: US 7,438,305 B2
(45) Date of Patent: Oct. 21, 2008

(54) AGRICULTURAL TRACTOR WITH MOVABLE STEP

(75) Inventor: Henry Jerome Schulz, Sanford (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 381 days.

(21) Appl. No.: 11/290,826

(22) Filed: Dec. 1, 2005

(65) Prior Publication Data

US 2007/0012498 A1    Jan. 18, 2007

Related U.S. Application Data

(60) Provisional application No. 60/698,972, filed on Jul. 14, 2005.

(51) Int. Cl.
*B60R 3/02*     (2006.01)
(52) U.S. Cl. .................. 280/166; 280/163; 182/2.1; 182/127
(58) Field of Classification Search .............. 280/163, 280/164.1, 166; 182/2.1, 2.2, 2.3, 2.5, 2.6, 182/2.7, 2.8, 86, 97, 126, 127; D12/203
See application file for complete search history.

(56) References Cited

U.S. PATENT DOCUMENTS

| 3,167,147 | A | * | 1/1965 | Symons et al. .............. 180/235 |
| 3,232,376 | A | * | 2/1966 | Lucas et al. .................... 182/97 |
| 4,245,716 | A | * | 1/1981 | Rayfield ....................... 182/86 |
| 5,597,050 | A | * | 1/1997 | Johnson ....................... 182/2.1 |
| 6,068,277 | A | * | 5/2000 | Magnussen .................. 280/166 |
| 6,264,227 | B1 | * | 7/2001 | Johnson et al. ............. 280/400 |
| 6,971,657 | B2 | * | 12/2005 | King et al. ................... 280/163 |
| 7,237,636 | B2 | * | 7/2007 | Ruppert et al. ........... 180/89.17 |
| 2005/0263976 | A1 | * | 12/2005 | Brockway .................... 280/166 |

* cited by examiner

*Primary Examiner*—Paul N Dickson
*Assistant Examiner*—John D. Walters
(74) *Attorney, Agent, or Firm*—Adrian D. Battison; Ade & Company Inc.

(57) ABSTRACT

A tractor has a frame defined by two side rails extending longitudinally carried on ground wheels with a cab on the frame at one end and an engine compartment at the other end. The cab has doors on each side and there are provided two operator platforms each attached to the frame at a respective side with suitable ladder, guard rails and surface by which the operator can climb to the cab. Each operator platform is mounted for movement longitudinally of the frame on levers allowing movement along the side of the frame from the cab entry position to an engine service position. The platform can cover operator serviceable parts which in the cab position which are exposed when the platform is moved to the engine service position.

13 Claims, 8 Drawing Sheets

US 7,438,305 B2

AGRICULTURAL TRACTOR WITH MOVABLE STEP

This application claims the priority under 35 U.S.C. 119 of Provisional Application No. 60/698,972 filed Jul. 14, 2005

This invention relates to an agricultural tractor with a movable step which can be located in a first position alongside a cab of the tractor and can be moved longitudinally of the tractor to a second position alongside an engine of the tractor.

BACKGROUND OF THE INVENTION

Today's self propelled agricultural equipment is a complex mix of leading edge, state of the art designs, and proven engineering methods. Self-propelled windrowing traction units which MacDon builds are no exception. They must provide maximum flexibility in a wide range of crops with a wide range of header options. To accommodate and provide the necessary resources for an ever increasing line of headers and their options, there must be a multitude of windrower system functions all packed in to the framework of the windrower. At the same time, all these systems; electrical, HVAC and hydraulics, to name just a few, must be away from the flow of crop, must not be cramped, and must be safely accessible and as user friendly as possible.

One aspect of the design requires the provision of suitable platform or platforms fro operator access into the cab. Most manufacturers of combine harvesters utilize a simple "swing-away" ladder and/or walkway arrangement, but the purpose of those designs is to allow the ladder to clear a width restriction to prevent ladder damage. They provide no further functionality.

Tractors for self propelled units such as swathers and sprayers have a wide frame defined by two side rails with one or more cross members which support the ground wheels. The frame rails are mounted high on large wheels to allow crop clearance. A cab is generally located at the front with the engine carried on the same frame rails spaced longitudinally is located at the rear. The cab often has two side doors. A suitable platform and ladder arrangement is commonly mounted on each side attached to the frame alongside the cab to allow the operator to climb into place.

SUMMARY OF THE INVENTION

It is one object of the invention to provide an improved arrangement of access platform for a tractor of this general type.

According to one aspect of the invention there is provided a tractor comprising:

a frame extending longitudinally of the tractor;

a plurality of ground wheels connected to the frame for transporting the frame over the ground generally in a direction along the longitudinal direction of the tractor;

a cab carried on the frame, the cab having a door on at least one side of the cab into which an operator can enter from one side of the frame for operating the tractor;

an engine mounted in an engine compartment on the frame at a position longitudinally spaced from the cab;

an operator platform located at a cab entry position on said one side of the frame and arranged such that the operator can climb onto the platform from the ground for entering from the platform through the door into the cab;

the operator platform being mounted for movement longitudinally of the frame from the cab entry position.

Preferably the operator platform is mounted for movement from the cab entry position to an engine service position along one side of the engine compartment by which the operator can stand on the platform in the engine service position and can access the engine in the engine compartment.

Preferably there is provided a latch assembly by which the platform can be latched in the cab entry position and into the engine service position.

Preferably the same latch cooperates with different elements on the platform for latched in each of the cab entry and engine service positions.

Preferably there are operating components of the tractor located under the platform and covered by the platform in the cab entry position which are exposed to view when the platform is moved longitudinally from the cab entry position.

Preferably the platform is carried on at least one lever pivotally connected to the frame at one end and to the platform at the other end such that the platform swings on the levers. An alternative arrangement of sliding on guides can be used but is less preferred in view of the risk of the guides becoming contaminated with the sliding becoming difficult.

Preferably there are two levers maintaining the platform parallel to the frame as it moves along the frame.

Preferably the two levers include a structural arm for supporting a majority of the weight of the platform and a steering arm.

The steering arm may be arranged such that it can be disconnected to allow to the platform to swing out away from the frame on the structural arm.

Preferably there are provided resilient stops for stopping the platform at the cab entry position and an opposed extreme position.

Preferably the frame includes a side rail and the platform is located along an outer side of the side rail.

In most cases the platform will include a ladder and guard rails mounted on a horizontal plate which remains horizontal as the platform is moved.

In the particular type of tractor for which the present arrangement is particularly designed, the frame includes a transverse beam to which wheels are connected and extending outwardly from longitudinal side rails and a front edge of the platform is preferably arranged such that it rests on a rear edge of the transverse beam in the cab entry position.

Preferably the platform includes a stop member for engaging and holding the door closed when the platform is moved from cab entry position.

According to a second aspect of the invention there is provided a tractor comprising:

a frame extending longitudinally of the tractor and having first and second sides;

a plurality of ground wheels connected to the frame for transporting the frame over the ground generally in a direction along the longitudinal direction of the tractor;

a cab carried on the frame;

an engine mounted in an engine compartment on the frame at a position longitudinally spaced from the cab;

a first operator platform located on the first side of the frame and including a horizontal support surface and a ladder such that the operator can climb onto the first platform from the ground to stand on the first platform;

a second operator platform located on the second side of the frame and including a horizontal support surface and a ladder such that the operator can climb onto the second platform from the ground to stand on the second platform;

the first and second operator platforms each being mounted for movement longitudinally of the frame from a first position alongside the cab to a second position alongside the engine compartment.

The space underneath the platforms is thus a suitable location to mount the valve blocks, toolbox, fuse panel, A/C breather, and batteries and at the same time keeping them well protected. The challenge lay in giving these components and the engine bay the safe serviceability and protection that is needed while not requiring the operator to fumble with guards, panels, pins and fold out ladders, etc.

The thought was to take the right and left side platform structures that provide safe, secure ingress and egress from the operator station at the cab end of the machine, and cause them be moved to the engine end of the machine. This only exposes the previously mentioned components underneath the platform for easy service but also provides the same safe, firm footing for serviceable items higher up at the engine and for any maintenance items under the hood of the tractor while it is open.

The arrangement thus provides a platform that pivots on a main structural arm to swing fore and aft on a horizontal arc along with a lighter steering arm link which is parallel to it which together stabilize and keep the platform parallel with the frame rails as it goes through its sweep.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
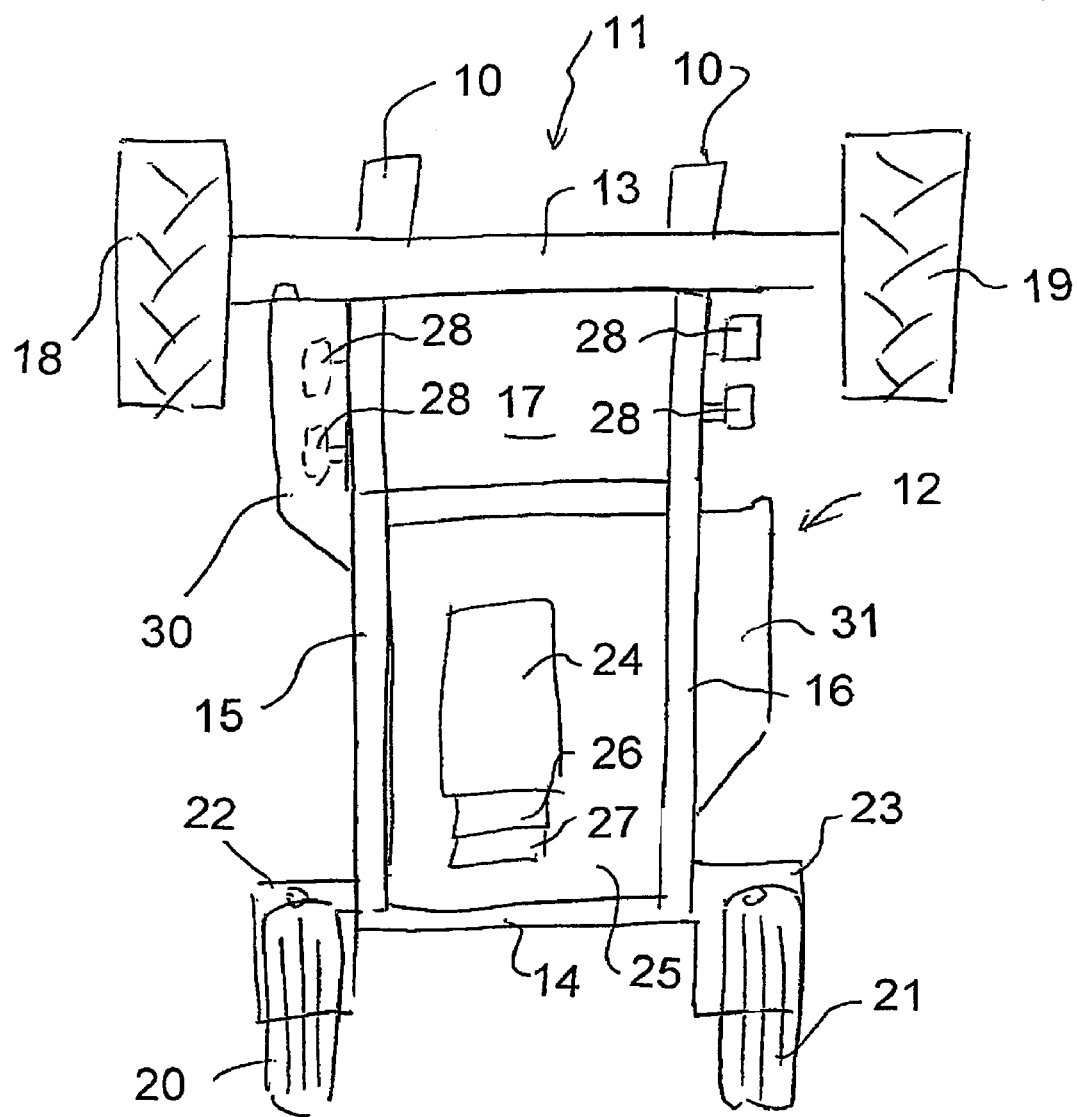
FIG. 1 is a top plan view of a tractor according to the present invention.

In FIG. 1 is shown schematically a tractor of the type commonly used for providing a self-propelled swather. The swather generally includes a header which is not illustrated but is mounted on arms 10 at the front of the tractor generally indicated at 11. The tractor comprises a frame generally indicated at 12 defined by cross members 13 and 14 at the front and rear of the frame together with longitudinal side rails 15 and 16.

In this type of tractor there is provided a cab 17 located at the front over the front cross member so that the operator can see over the header attached to the arms 10 for forward operation of the tractor. The frame is mounted on front ground wheels 18 and 19 and on rear ground wheels 20 and 21. Commonly the front ground wheels 18 and 19 are the driven wheels which are hydraulically driven. The rear wheels 20 and 21 are commonly castor wheels mounted on castors schematically indicated at 22 and 23 so that the control of the speed and direction of the tractor is governed by the speed of the driven wheels 18 and 19 with the castor wheels merely following.

An arrangement of thus type is showing in co-pending application filed Apr. 28, 2005, Ser. No. 11/116,418 and Canadian application filed Apr. 27, 2005, Serial No.: 2,505,458 filed by the present assignees, the disclosure of which is incorporated herein by reference.

The tractor includes an engine schematically indicated at 24 carried within an engine compartment 25 including a hood and covers which protect the engine. The engine compartment includes further components such as pumps 26 and 27 which are driven by the engine and many other components as are well known to one skilled in the art. In addition the tractor includes further control and drive components which provide the necessary accessories and arrangements for controlling and driving the tractor and the header and some of these elements are attached to the side of the frame as indicated at 28. Again such components are well known to one skilled in the art that include hydraulic controls, electrical controls, a battery and similar elements.

The engine compartment and the cab both have a width equal to the width of the frame so that they sit on the frame with the sides of the frame defined by the side rails 15 and 16 so that the side rails are exposed at the sides of the structure.

It is well known that it is necessary to provide for the operator several platforms at the sides of the cab so that the operator can access the cab. The operator shows the height of the side rails 15 and 16 can be of the order of 5 to 6 feet above the ground so that the safety of the operator must be protected by providing a ladder, a platform and guard rails allowing the operator to safely climb to the height of the frame and then enter the cab by opening a door on one or both sides to allow access to the interior of the cab.

In the present arrangement, the platforms are indicated at 30 and 31 on respective sides of the frame with each of the platforms attached to a respective one of the side rails 15, 16. In this arrangement the platforms are both mounted for movement longitudinally of the frame so that each can take a position in the cab entry position immediately adjacent the side of the cab and an engine service position adjacent the side of the engine compartment 25. In FIG. 1 the platform 30 is shown schematically in the cab entry position and the platform form 31 is shown moved to the engine service position.

In FIG. 1 the engine accessories 28 are covered and protected by the platform in the cab entry position showing the lefthand side and are open and exposed for access on the right hand side as shown where the platform 31 has been moved to the engine surface position.

Figure 5:
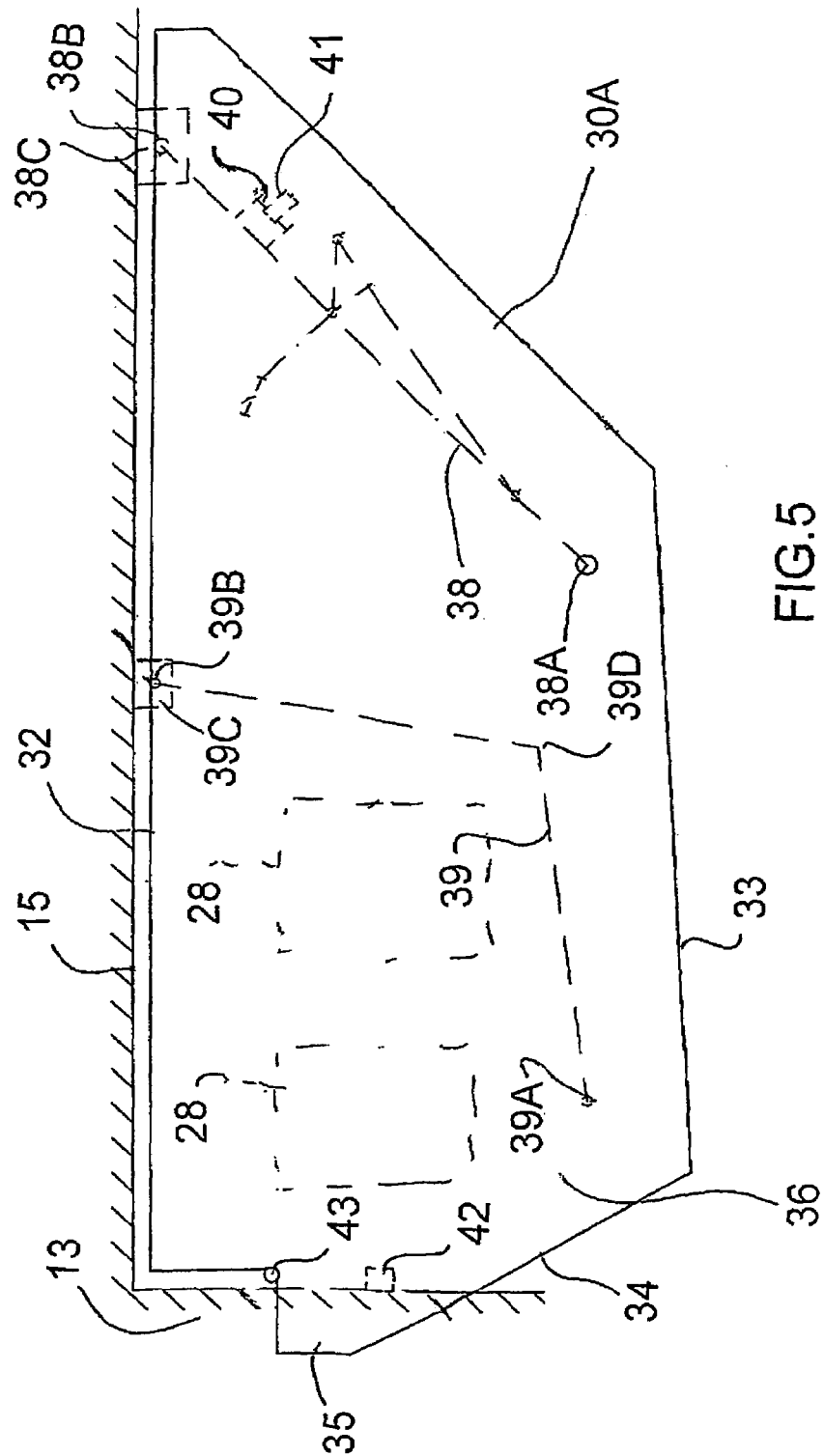
FIG. 5 is a top plan view showing schematically the arrangement and location of the support leavers of the platform, with the platform shown in the cab entry position.
Figure 6:
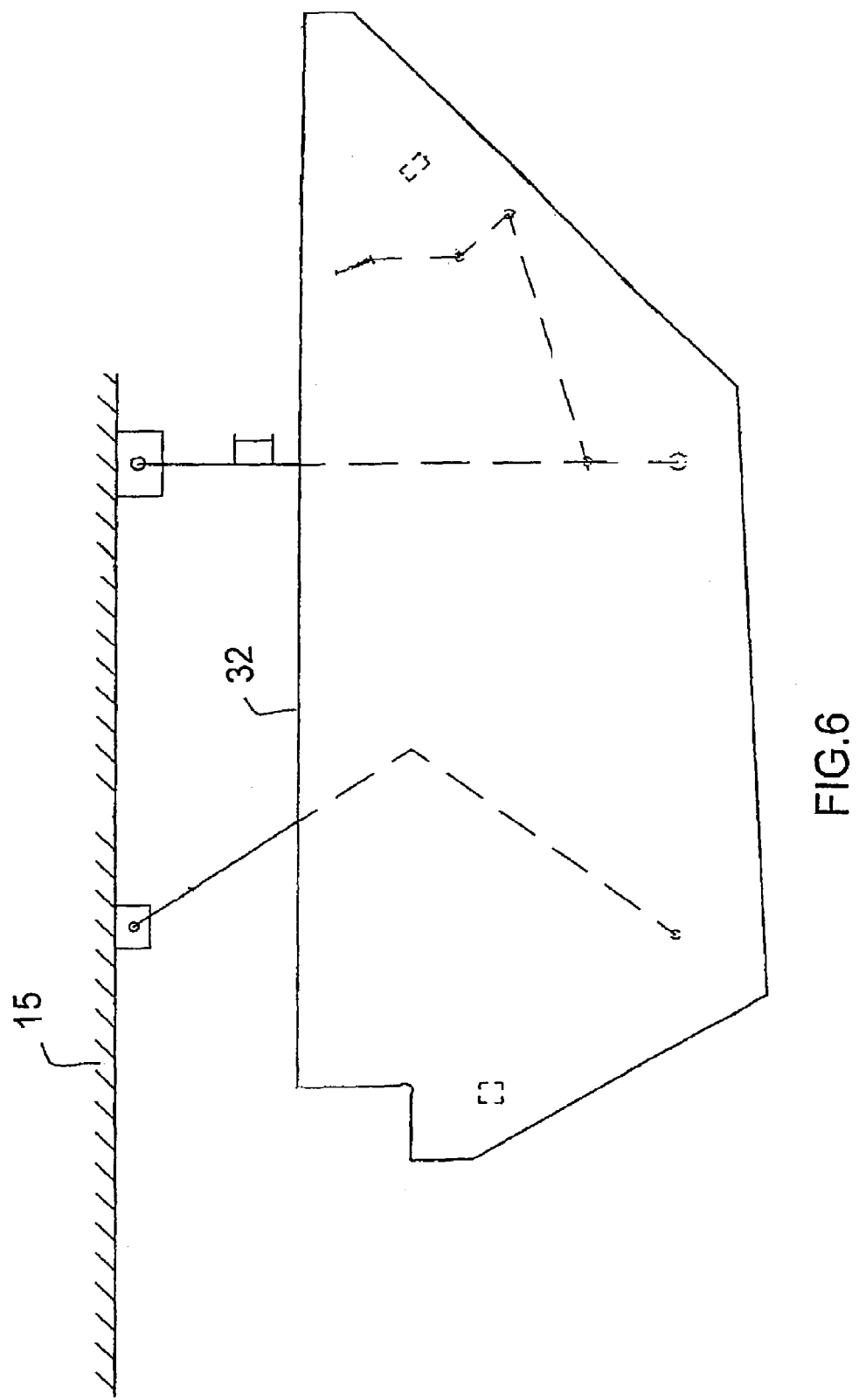
FIG. 6 is a top plan view similar to FIG. 5 showing the platform in the intermediate position between the cab entry position and the engine service position.
Figure 7:
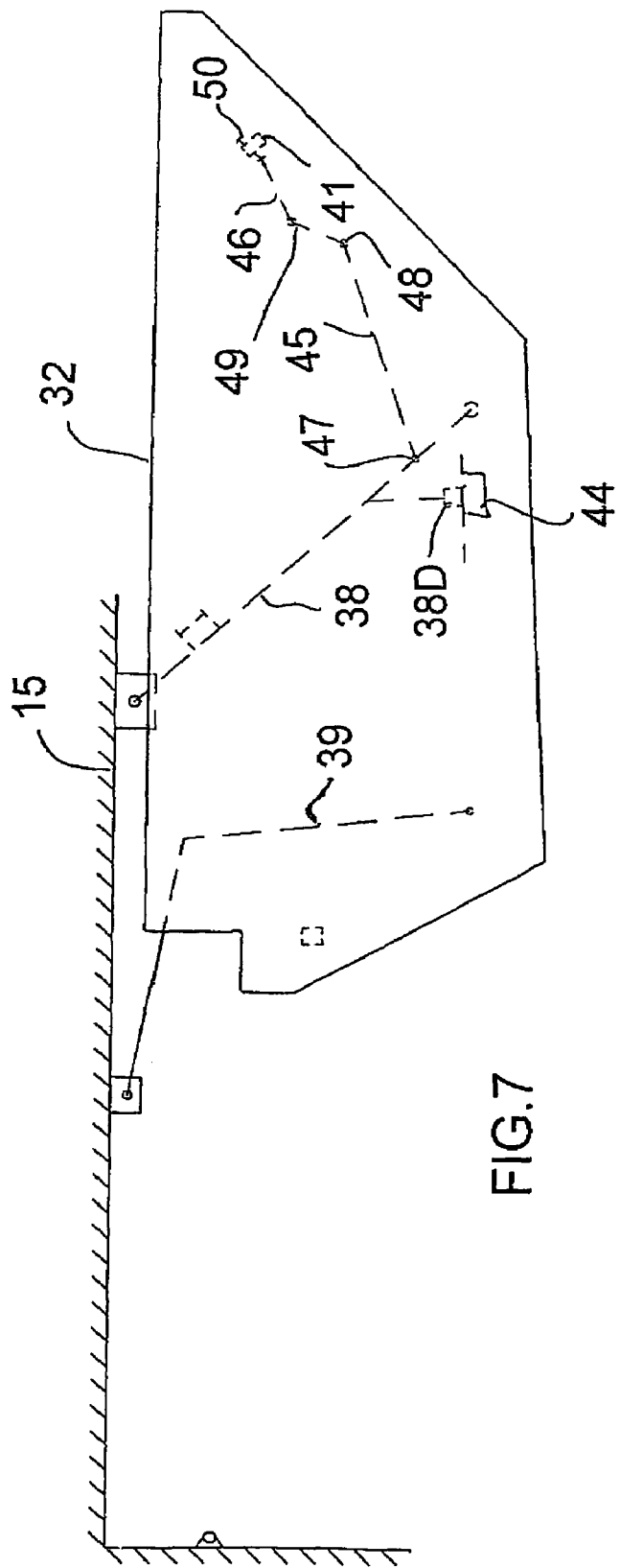
FIG. 7 is a top plan view shown the platform in the engine service position.
Figure 8:
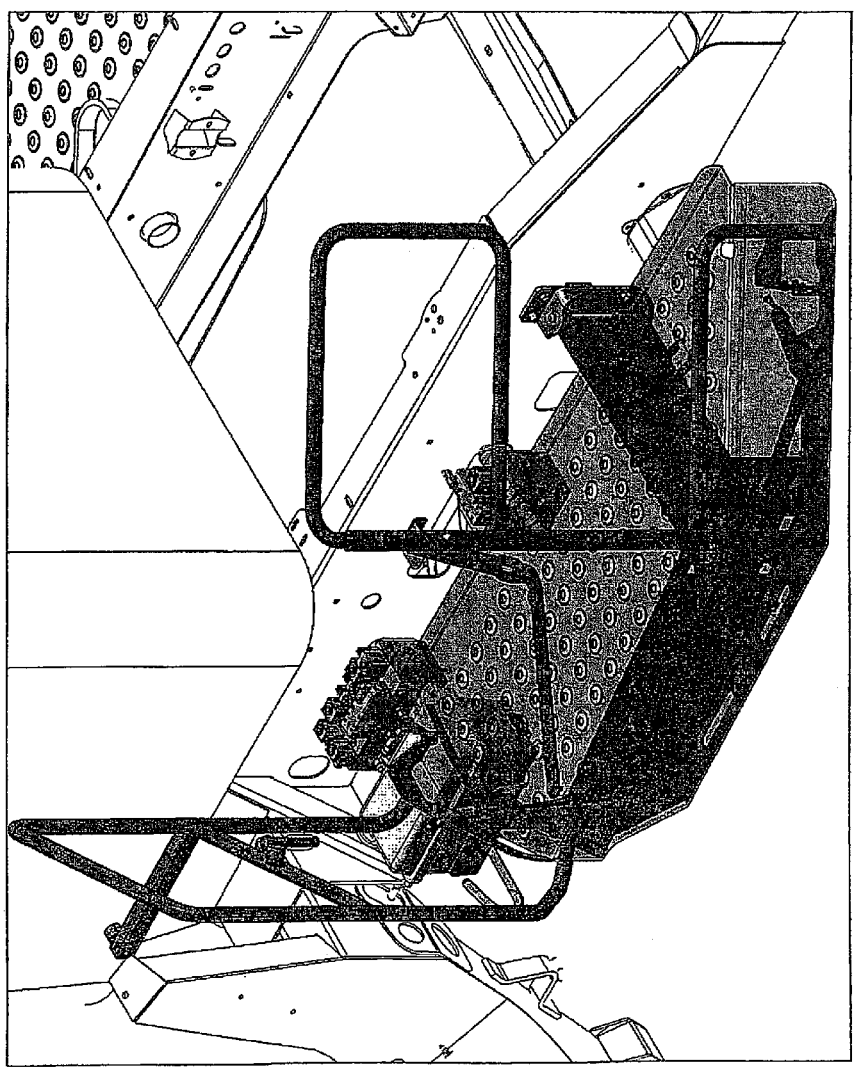
FIG. 8 is an isometric view similar to that of FIG. 2 showing the platform in the midway position of FIG. 6.

Turning now to FIGS. 5, 6 and 7, the movement of the platform is shown in more detail in schematic arrangement. Thus the platform has an inner edge 32 which is arranged to lie directly alongside the side edge of the respective side rail as indicated at 15 leaving merely a gap for clearance. The platform further has an outer edge 33 spaced outwardly from the edge 32 to provide a sufficient room for the platform to receive the standing or kneeling operator into the comfortable arrangement. A forward side of the platform as indicated at 34 extends from the outer edge 33 to the inner edge 32 and includes a forwardly projecting lug portion 35 which lies over the top of the cross member 13 so that the lug member sits in the cross member 13 to ensure stability of the structure when in the cab entry position.

The platform comprises a horizontal surface 36 defined by a top plate with suitable slip resistant surface. The platform is supported on a main structural support arm 38 and on a steering arm 39 which acts to guide the movement of the platform. The main structural arm 38 therefore is in the form a beam which provides resistance to twisting. The arm 38 includes an outer end pivot 38A and an inner end pivot 38B. These pivots are provided by suitable sleeves defined at the beam so as to maintain the axis at the pivots 38A and 38B parallel and vertical. The pivot 39A is attached to the platform at a position spaced inwardly from the outer edge 33. The pivot 38B is attached to a lug 38C carried on the side of the rail 15. The arm 38 is straight between the two pivot members. The steering arm 39 has an outer pivot 39A also attached to the platform a position spaced inwardly from the outer edge 33 and generally aligned with the pivot point 38A. The arm 39 also has an inner pivot 39B attached to a lug 39C carried on the rail 15. The steering arm 39 and the structural arm 38 thus form an effective four bar linkage so that the platform can rotate around the two pivot axes defined by the pivot 39B and 3B so that the platform swings outwardly away from the rail 15 as shown in FIG. 6 to the engine service position shown in FIG. 7. The structural arm 38 carries a pin 40 on one side of the arm which snaps into a latch 41 when the platform reaches the cab entry position. This holds the platform in this position and is maintained against both longitudinal and lateral movement relative to the frame together with the being supported against vertical movement so as to be stable in position. The platform carries a cushion member 42 on the underside which butts against the frame member 13 when the platform reaches the cab entry position. This allows a soft entry into the cab entry position and maintains pressure against the latch. A locating pin 43 also acts to hold the platform in place against the frame member 13.

The steering arm 39 includes two portions bent at an angle to one another defined by an apex 39D so that it is angled around the area containing the engine and control accessories 28 underneath the platform. This allows the steering arm to enter its position in both positions of the platform without interfering with the elements located under the platform.

In the position shown in FIG. 7, the arms 38 and 39 have pivoted so that they move the platform along the frame defined by the rail 15 to the position adjacent the engine for the engine service position. An abutment 38D on the arm 38 butts against a fixed stop 44 on the platform when the platform reaches the engine service position to again provide a soft resilient entry into the engine service position. The arm 38 and therefore the platform are locked in this position by a pair of links 45 and 46. The link 45 is pivoted at one end 47 to the arm 38. The other end of the link 45 is pivoted to an end of the link 46 at a pivot coupling 48. The link 46 is pivoted on the platform at a pivot point 49. The link 46 carries a latch pin 50 which cooperates with same latch 41 carried on the platform. Thus the link arrangement provided by the two links 45 and 46 acts to move the pin 50 into the latch position during the movement of the platform so that the same latch can be used to hold the platform both in the forward cab entry position and the rearward engine service position. In the rear engine service position, the inner edge 32 of the platform is arranged at a slightly greater spacing from the side rail 15 to allow a great clearance to accommodate engine covers and the like in the area of the frame 15.

Figure 2:
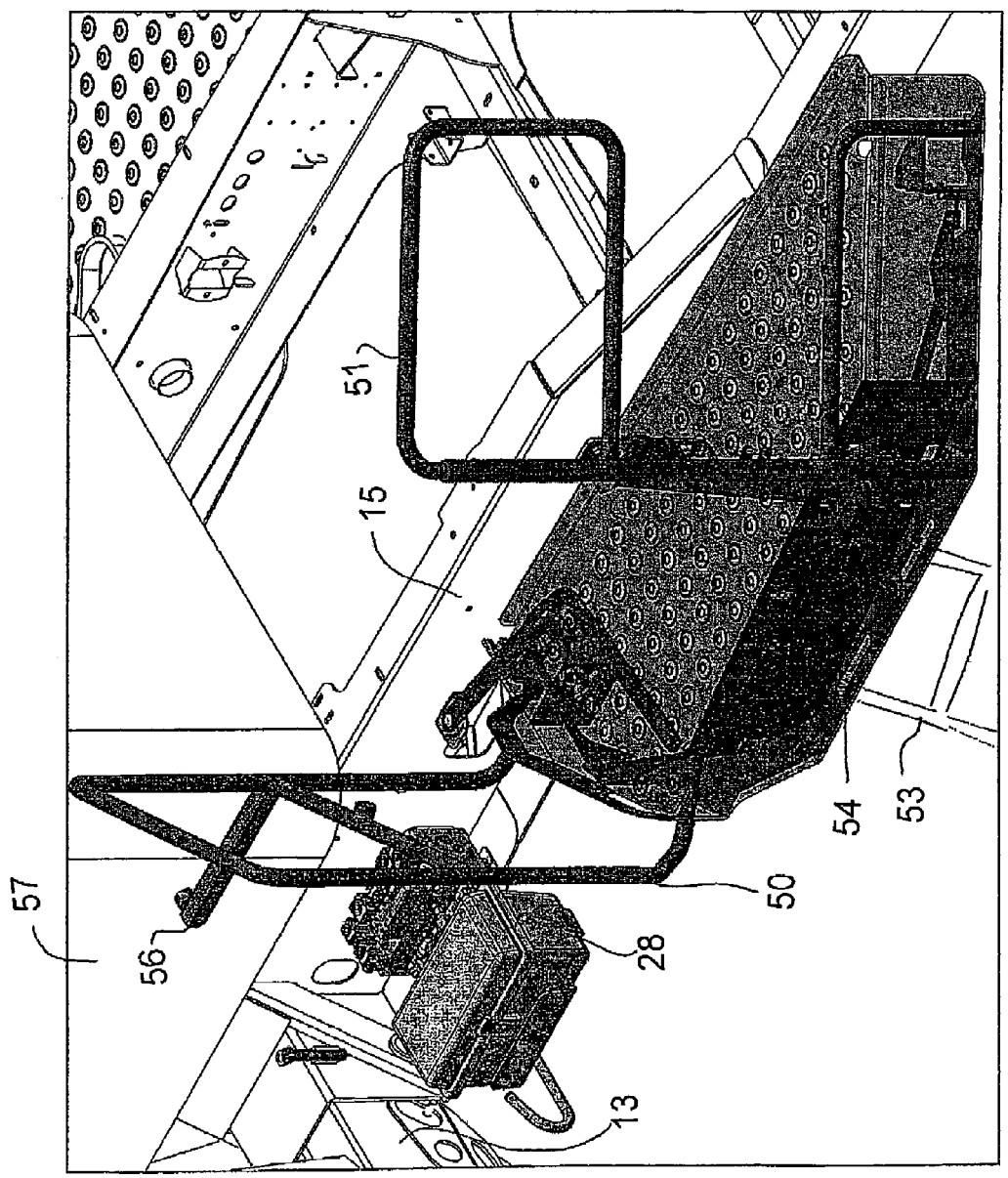
FIG. 2 is an isometric view partly in phantom of one part of the tractor of FIG. 1 showing the platform in the engine service position.
Figure 3:
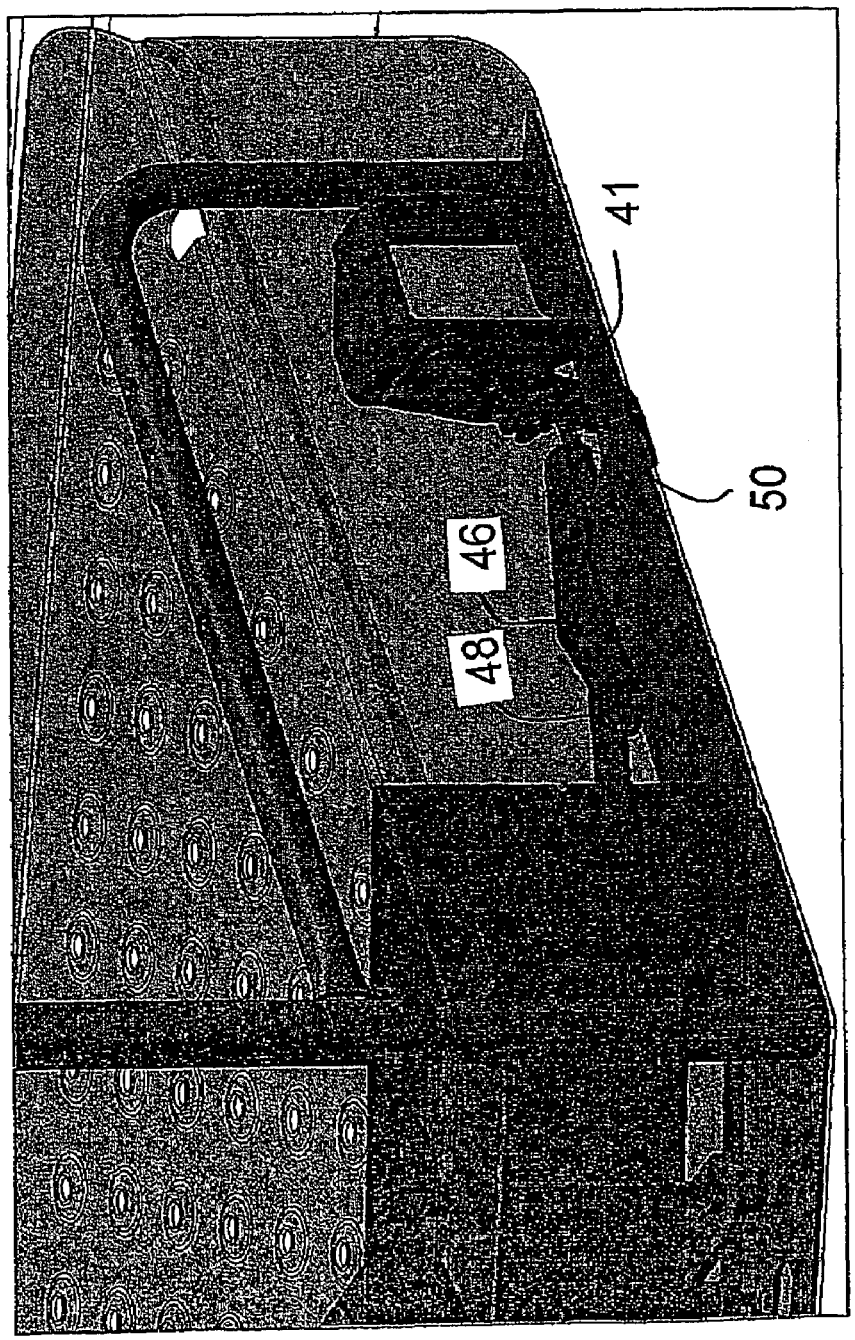
FIG. 3 is an isometric view showing a rear part only of the platform.
Figure 4:
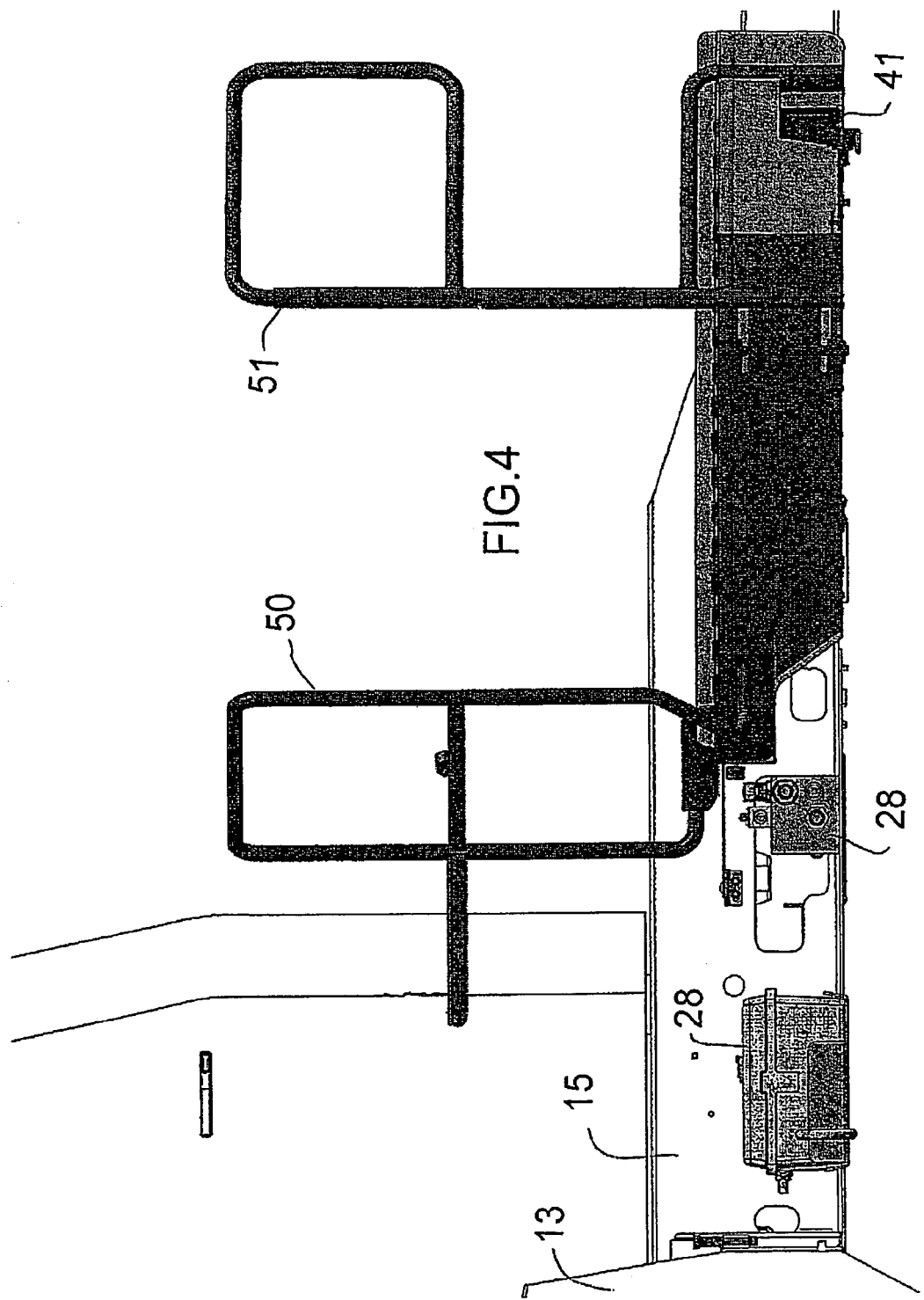
FIG. 4 is a side elevational view of the platform and the portion of the tractor shown in FIG. 2.

Turning now to FIGS. 2, 3 and 4 further details of the platform are shown. Thus in FIG. 2 it would be noted that the platform includes guard rails 50 and 51 on respective sides of the platform. A central open area of the platform receives a ladder 53 which is releasable coupled to suitable mounting 54 at the edge 33 of the platform. Thus the operator can climb the ladder onto the platform and is maintained in the area of the platform by the guard rails. The latch 41 is located on the underside of the platform so it is accessible from ground but cannot be unlatched inadvertently by an operator standing on the platform.

Stop member 56 is provided attached to the guard 50 and projecting outwardly from one side of the guard rail so that the stop member 56 is moved into contact with the outside surface of a door 57 of the cab when the platform is in the engine service position. In this way, when an operator moves the platform to the engine service position, it is not possible for another person in error within the cab to open that door of the cab and fall out of the cab by being surprised by absence of the platform since the door is prevented from opening when the platform is in the engine service position.

In the cab entry position, the front edge 34 of the platform 30 locates onto a fixed ¾" replaceable striker bolt along with a rubber bumper and is held firm from lateral and vertical movement. The rear end 30A has the adjustable latch 41 and striker bolt arrangement in a position on the main arm 38 such that it offers high mechanical advantage for the latch. This ensures a solid, secure closure and reduced wear and tear on both the replaceable latch and the M12 replaceable bolt.

To open, the operator releases the single position latch 41 and pulls the platform back. The links which aid in securing the platform when in the open position include the first link 45 which is attached to the main structural arm and is in turn attached to the second link 46 which has its own M12 striker. When opening, both the steering arm 39 and structural arm 38 are parallel to each other and move as in a four bar link approximately parallel to the frame rail. They are slightly different length so that the platform will close snugly and have ample clearance to the hood when open. The steering arm has a multitude of adjustments to provide secure latching action in both the open and closed position, as well as smooth motion in between.

As the links 45 and 46 automatically unfold when swinging open the platform, link 46 with the M12 striker bolt will locate into the same latch used in the closed position.

To close, the operator simply releases the latch 41 and pushes the platform towards the cab which again will locate the front edge back into the ¾ inch striker.

Due to the fact that windrowers must be quite high off the ground and wide for bushy crops, the service items are higher up too, on top of the hood and at the back of the machine in the engine bay. This means that the operator is either leaning over the hood to fill fuel or hydraulic oil, or reaching into the engine bay to deal with any longer interval service items that may arise. In either case, whether it is a 20 L pail of hydraulic fluid or priming the fuel system, the platforms stay latched in place so that when a person is doing these things, the platforms will not move out and away. The safety grip has been specifically designed to not only provide sure footed grip, but to allow for kneeling and working on top of the platform without undue stress to the knees.

There is a short arm with a rubber bumper located on the front railing that, when the platform is in the open position, interferes with the door on the cab. In this way, the door can only be slightly opened which prevents anyone from accidentally falling from the machine when the platforms are not there.

Due to the fact that the latching mechanism is under the platform, at no time can anyone standing on the platform inadvertently release it, which prevents unexpected motion and a potential fall from the machine.

A different approach may have been to design the platform to move back and forth on rails. This would go against a basic design principle to use pivots instead of rails wherever possible and would present its own challenges of wear, and poor movement due to the build up of debris in the rails.

As an alternative to the use of a latch, detents, large locating arms and drop in pins are all arrangements which could be used as an alternative, but less satisfactorily.

The tractor must accept ever changing crop and header options. Grass and grass seed producers must cut at night to prevent shelling out of the seeds and plant breakage. They also have requirements on their cut heights so they continually look down to monitor stubble height. Ideally, they like to judge the stubble and make the necessary height adjustment quickly so looking as close behind the header as possible is a value added benefit that our design gives them. Because the platforms stay locked in the open position, one can be left open and out of the way of the sight line with no modifications. This allows the operator driving at night the ease and accuracy of seeing straight down behind the drive wheel at the cut crop height and making the necessary adjustments on the fly. When field conditions are rough, the steering arm 39 and the platform itself can be fastened together with common hardware in the open position, thus locking the whole mechanism in place in order to keep wear and tear to a minimum.

The Double Windrower Attachment (DWA) is another cropping attachment for the swather that affects the design of the platform. The stairs for the platforms needs to be able to come off easily to avoid the DWA and also be stored so that the stairs are bolted on and simply are turned upside down and re-bolted back to the side of the platform. This gets them out of the way of the DWA and prevents falling through the opening.

It is worth mentioning too, that the steering arm 39 is attached at both ends with nuts and bolts. If extra room is needed for servicing the components underneath, the platform can be put into its open position and the steering arm 39 pulled off which allows the front of the platform to swing out even further.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A tractor comprising:
a frame extending longitudinally of the tractor;
a plurality of ground wheels connected to the frame for transporting the frame over the ground generally in a direction along the longitudinal direction of the tractor;
a cab carried on the frame, the cab having a door on at least one side of the cab defining a cab entry position from which an operator can enter from into the door on said at least one side of the frame for operating the tractor;
an engine mounted in an engine compartment on the frame at a position longitudinally spaced from the cab and defining an engine service position along one side of the engine compartment by which the operator can stand on the platform in the engine service position and can access the engine in the engine compartment;
an operator platform on said one side of the frame and arranged such that the operator can climb onto the platform from the ground;
the operator platform having an inner edge adjacent the side of the frame and an outer edge remote from the frame;
the operator platform being mounted on a mounting arrangement for movement longitudinally of the frame between the engine service position and the cab entry position;
the mounting arrangement being arranged such that the operator platform moves between the engine service position and the cab entry position such that in both the engine service position and the cab entry position the inner edge of the platform remains adjacent the frame and the outer edge remains remote from the frame.

2. The tractor according to claim 1 wherein there is provided a latch assembly by which the platform can be latched in the cab entry position and in the engine service position.

3. The tractor according to claim 2 wherein the latch assembly comprises a ingle latching member which cooperates with different elements on the platform for latching in each of the cab entry and engine service positions.

4. A tractor comprising:
a frame extending longitudinally of the tractor;
a plurality of ground wheels connected to the frame for transporting the frame over the ground generally in a direction along the longitudinal direction of the tractor;
a cab carried on the frame, the cab having a door on at least one side of the cab defining a cab entry position from which an operator can enter from into the door on said at least one side of the frame for operating the tractor;
an engine mounted in an engine compartment on the frame at a position longitudinally spaced from the cab and defining an engine service position along one side of the engine compartment by which the operator can stand on the platform in the engine service position and can access the engine in the engine compartment;
an operator platform on said one side of the frame and arranged such that the operator can climb onto the platform from the ground;
the operator platform having an inner edge adjacent the side of the frame and an outer edge remote from the frame;
wherein the platform is carried on at least one lever mounted for pivotal movement relative to the frame at one end of the lever and for pivotal movement relative to the platform at the other end of the lever such that the platform swings on the at least one lever for movement longitudinally of the frame between the engine service position and the cab entry position;
said at least one lever being arranged such that the operator platform moves between the engine service position and the cab entry position such that in both the engine service position and the cab entry position the inner edge of the platform remains adjacent the frame and the outer edge remains remote from the frame.

5. The tractor according to claim 4 wherein the at least one lever includes two levers arranged to maintain the platform parallel to the frame as it moves along the frame.

6. The tractor according to claim 5 wherein the two levers include a first lever forming a structural arm for supporting a majority of the weight of the platform and a second lever forming a steering arm.

7. The tractor according to claim 5 wherein the second lever forming the steering arm can be disconnected to allow to the platform to swing out away from the frame on the first lever forming the structural arm.

8. The tractor according to claim 1 wherein there are provided resilient stops for stopping the platform at the cab entry position and the engine service position.

9. The tractor according to claim 1 wherein the frame includes a transverse beam to which wheels are connected and extending outwardly from longitudinal side rails and wherein a front edge of the platform rests on a rear edge of the transverse beam in the cab entry position.

10. The tractor according to claim 1 wherein the platform includes a stop member for engaging and holding the door closed when the platform is moved from cab entry position.

11. A tractor comprising:
a frame extending longitudinally of the tractor and having first and second sides;
a plurality of ground wheels connected to the frame for transporting the frame over the ground generally in a direction along the longitudinal direction of the tractor;
a cab carried on the frame;
an engine mounted in an engine compartment on the frame at a position longitudinally spaced from the cab;
a first operator platform located on the first side of the frame and including a horizontal support surface and a ladder such that the operator can climb onto the first platform from the ground to stand on the first platform;
a second operator platform located on the second side of the frame and including a horizontal support surface and a ladder such that the operator can climb onto the second platform from the ground to stand on the second platform;
each of the first and second operator platforms having an inner edge adjacent the side of the frame and an outer edge remote from the frame;
the operator platform being mounted for movement longitudinally of the frame between the engine service position and the cab entry position;
the first and second operator platforms each being mounted on a respective mounting arrangement for movement longitudinally of the frame from a first position alongside the cab to a second position alongside the engine compartment;
each respective mounting arrangement being arranged such that the respective operator platform moves between the first position and the second position such that in both the first position and the second position the inner edge of the respective operator platform remains adjacent the frame and the outer edge remains remote from the frame.

12. The tractor according to claim 11 wherein each platform includes a respective latch assembly by which the respective platform can be latched in the first and second positions.

13. The tractor according to claim 11 wherein each platform is carried on at least one respective lever mounted for pivotal movement relative to the frame at one end of the respective lever and to the platform at the other end of the respective lever such that the platform swings on the at least one respective lever for movement longitudinally of the frame between the first position and the second position.

* * * * *